United States Patent [19]
Chen et al.

[11] Patent Number: 4,878,723
[45] Date of Patent: Nov. 7, 1989

[54] OPTICALLY CONTROLLED SEMICONDUCTOR WAVEGUIDE INTERFEROMETER APPARATUS

[75] Inventors: Ying C. Chen, Closter, N.J.; Jia-ming Liu, Arlington; Michael A. Newkirk, Auburndale, both of Mass.

[73] Assignee: GTE Laboratories Incorporated, Waltham, Mass.

[21] Appl. No.: 826,644

[22] Filed: Feb. 6, 1986

[51] Int. Cl.⁴ .................... G02B 6/10; H01J 40/14; G01B 9/02; H01L 27/14
[52] U.S. Cl. .................... 350/96.14; 350/96.11; 350/96.12; 350/96.13; 250/211 J; 356/345; 357/30
[58] Field of Search ............... 350/96.11, 96.12, 96.13, 350/96.14, 96.15, 96.29, 96.30; 357/16, 17, 19, 30; 356/345; 250/211 J

[56] References Cited
U.S. PATENT DOCUMENTS 4,111,521 9/1978 Streifer et al. .................. 350/96.13
4,546,244 10/1985 Miller .............................. 250/211 J
4,840,446 6/1989 Nakamura et al. ............. 350/96.13

Primary Examiner—John D. Lee
Assistant Examiner—Brian M. Healy
Attorney, Agent, or Firm—Fred Fisher; J. J. Cannon, Jr.

[57] ABSTRACT

An optically controlled semiconductor waveguide interferometer apparatus includes a Mach-Zehnder interferometer formed of semiconductor laser materials. A first optoelectronic switching means is adapted to be coupled across a first voltage potential and one of the optical paths of the interferometer. The first optoelectronic switching means has a first gap therein. Likewise, a second optoelectronic switching means is adapted to be coupled across a second voltage potential and the other of the optical paths. The second optoelectronic switching means has a respective gap therein. Light pulses are applied to the two gaps for controlling the index of refraction of the optical paths, whereby the light pulses control the interferometer so that the output intensity of the interferometer is modulated.

14 Claims, 2 Drawing Sheets

OPTICALLY CONTROLLED SEMICONDUCTOR WAVEGUIDE INTERFEROMETER APPARATUS

BACKGROUND OF THE INVENTION

1. Field of the Invention

This invention relates to optically controlled semiconductor waveguide interferometer apparatus and, in particular, to semiconductor waveguide interferometers for optical signal processing. Accordingly, it is a general object of this invention to provide new and improved apparatus and interferometers of such character.

2. General Background

It is known that refractive index changes, in a connection with semiconductor laser materials, may come from the difference in material compositions (in the case of buried heterostructure), the elasto-optic effect as discussed by P. A. Kirkby, P. R. Selway and L. D. Westbrook, "Photoelastic waveguides and their effect on stripe-geometry GaAs/Ga$_{1-x}$Al$_x$As lasers", J. Appl. Phys. 50, 4567 (1979), or the stripe-loading effect as discussed in "Integrated Optics", T. Tamir, editor (Springer Verlag, New York, 1975). See, especially, pages 243-271.

SUMMARY OF THE INVENTION

It is another object of this invention to provide a new and improved optically controlled semiconductor waveguide interferometer apparatus whereby an interferometer is controlled by a light pulse so as to modulate its output intensity.

Still another object of this invention is to provide a new and improved optically controlled semiconductor waveguide interferometer apparatus whereby a pair of light pulses control an interferometer so as to modulate its output intensity.

In accordance with one aspect of this invention, an optically controlled semiconductor waveguide interferometer apparatus includes a Mach-Zehnder interferometer formed of semiconductor laser materials selected from the group consisting of double heterostructure and quantum-well semiconductor laser materials. The interferometer has a carrier input port and a carrier output port, and two optical paths coupling the ports together for dividing an applied input optical signal and then recombining the divided input signal after passing through the two optical paths, and providing the recombined signal onto the output port. The apparatus further includes a first optoelectronic switching means adapted to be coupled across a first voltage potential and one of the optical paths. The first optoelectronic switching means has a gap therein. Further, the apparatus includes means for applying a first light pulse to the gap for controlling the index of refraction of the one optical path. Thus, the first light pulse controls the interferometer so that the output intensity of the interferometer is maximized.

In accordance to certain features of the invention, the Mach-Zehnder interferometer is formed of double heterostructure semiconductor laser materials. In accordance with other features, the Mach-Zehnder interferometer can be formed of quantum-well semiconductor laser materials. The optical paths can be selected from the group consisting of semiconductor laser materials, free space, and optical fibers. A first of the optical paths can include a pathway without the semiconductor laser materials. A pathway can include free space. A first of the optical paths can coincide with the one of the optical paths.

In accordance with another aspect of the invention, an optically controlled semiconductor waveguide interferometer apparatus can include a Mach-Zehnder interferometer formed of semiconductor laser materials selected from the group consisting of double heterostructure and quantum-well semiconductor laser materials. The interferometer has a carrier input port and a carrier output port, and has two optical paths coupling the ports together for dividing an input optical signal applied to the input port, and then recombining the divided input signal after passing through the two optical paths and providing the recombined signal onto the output port. The apparatus includes first optoelectronic switching means adapted to be coupled across a first voltage potential and one of the optical paths, the first optoelectronic switching means having a first gap therein. A second optoelectronic switching means is adapted to be coupled across a second voltage potential and the other of the optical paths. The second optoelectronic switching means has a respective gap therein. The apparatus further includes means for applying a first light pulse to the first gap for controlling the index of refraction of the one optical path, and means for applying a second light pulse to the respective gap for controlling the index of refraction of the other optical path. Thus, the light pulses control the interferometer so that the output intensity of the interferometer is maximized.

In accordance with certain features thereof, the optical controlled interferometer apparatus has its Mach-Zehnder interferometer formed of double heterostructure laser materials. In accordance with other features, the Mach-Zehnder interferometer can be formed of quantum-well semiconductor laser materials. The optical paths can be selected from the group consisting of semiconductor laser materials, free space, and optical fibers. A first of the optical paths can include a pathway without the semiconductor laser materials. The pathway can include free space, and the first of the optical paths can coincide with the one of the optical paths.

BRIEF DESCRIPTION OF THE DRAWINGS

Other objects, advantages and features of this invention, together with its construction and mode of operation, will become more apparent from the following description, when read in conjunction with the accompanying drawing, in which.

DESCRIPTION OF PREFERRED EMBODIMENTS

Figures 1, 3:
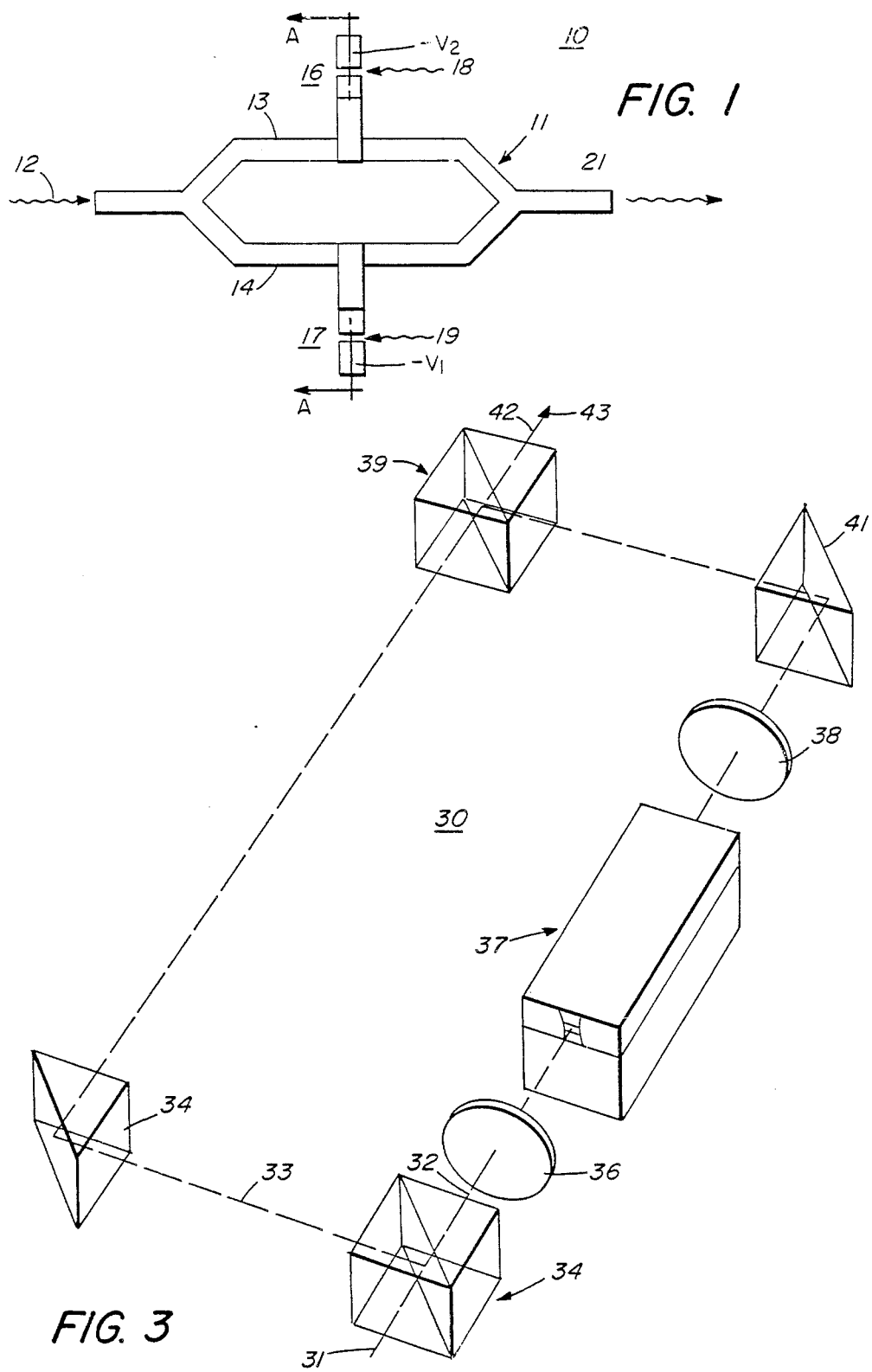
FIG. 1 is a plan view of an optically controlled semiconductor waveguide interferometer in accordance with one embodiment of the invention.
FIG. 3 is a schematic view of another embodiment of the invention.

An optically controlled semiconductor waveguide interferometer apparatus 10 is depicted generally in FIG. 1 which includes a Mach-Zehnder interferometer 11 formed on double heterostructure or quantum-well semiconductor laser materials. An input optical signal 12 is divided and then recombined after passing through two arms 13, 14 of the interferometer 11. Part of the optical paths, in the two arms 13, 14, can be replaced by free space, optical fiber, or other types of waveguides.

The desired refractive index step in the lateral direction may come from the differences in material compositions (in the case of buried heterostructure), the elasto-optic effect as discussed by Kirkby et al. supra, or the stripe loading effect as discussed by Tamir supra.

Figure 2:
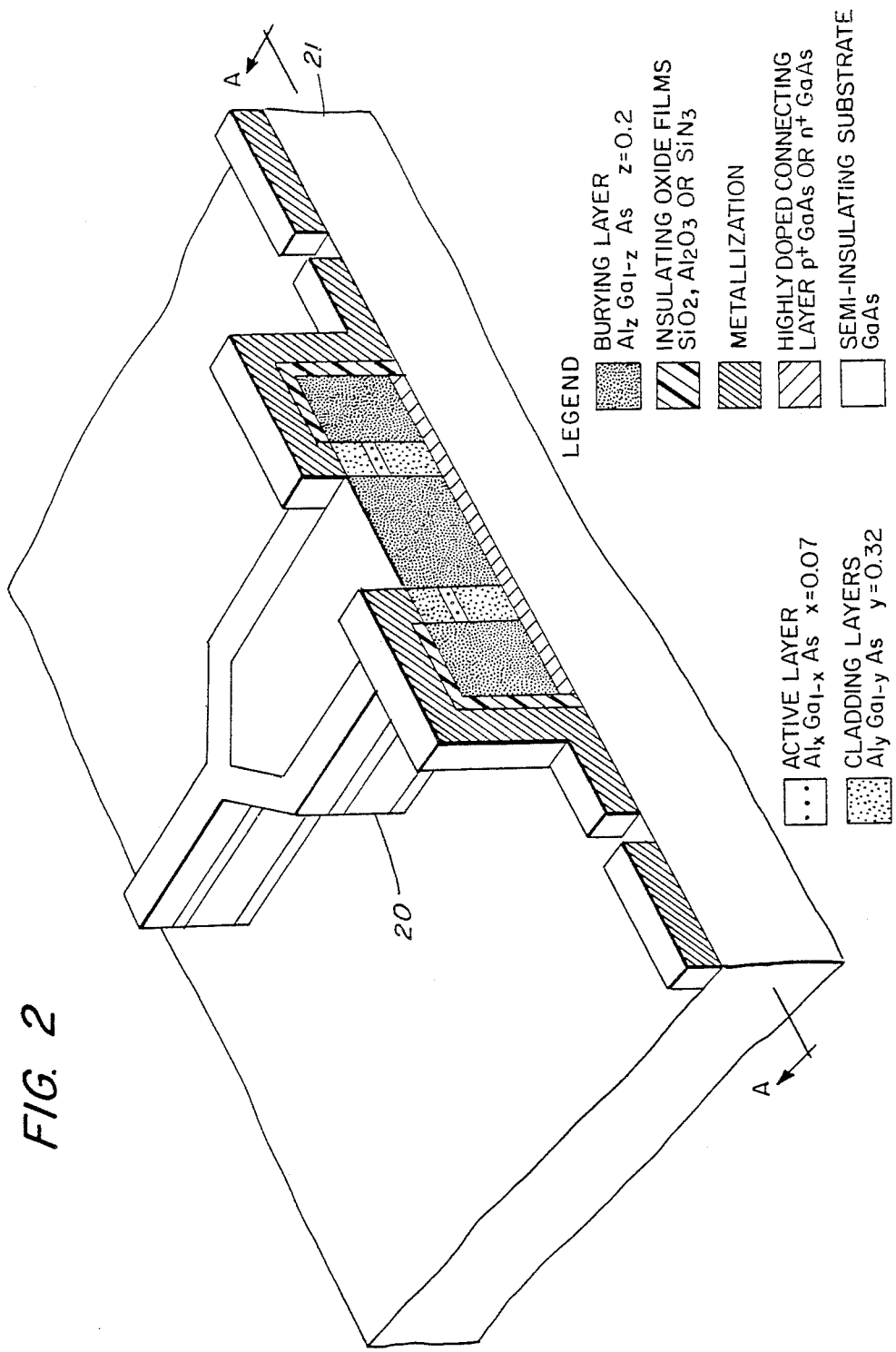
FIG. 2 is a perspective sectional view taken along the line A—A of FIG. 1.

A controllable phase shift of the optical signal can be produced in the waveguide by carrier injection, through optoelectronic switches 16, 17 which, in turn, are controlled by optical control pulses 18, 19, respectively. The injected carriers change the refractive index of the waveguide and thereby change the interference condition at the output port 21. As an example, a cross-section of such a device, shown perspectively, viewed through the line A—A of FIG. 1 is depicted in FIG. 2. In this example, the waveguide shown is an AlGaAs/AlGaAs buried heterostructure 20 grown on a semi-insulating GaAs substrate 21.

In order to produce the maximum change in the output intensity of the interferometer, the relative phase change of light passing through the optical path lengths of the two interference arms 13, 14 should be $$\Delta\phi \simeq 0.25 \Delta n \; k \; d = \pi$$

where $\Delta n$ is the refractive index change with and without carrier injection, k is the wave vector of the input signal, and d is the length of the carrier-injected waveguide region. The factor 0.25 is a typical mode confinement factor in the active layer. In an AlGaAs/GaAs buried heterostructure laser material, $\Delta n = 0.01$ when the carrier density is $5 \times 10^{18}/cm^3$ as taught by Tamir supra. At a light wavelength $\lambda = 1.06$ μm, which is below the bandgap of the AlGaAs/GaAs material, the wave vector $k = 5.93 \times 10^4$ cm$^{-1}$. The length of the waveguide required to produce a phase shift of $\pi$ is $d = 4\pi/k\Delta n = 212$ μm. The current required to inject a carrier density of $5 \times 10^{18}/cm^3$ for producing this amount of phase shift is on the order of 50 mA.

The refractive index change caused by injected carriers is a complex number: $\Delta n + i\alpha/2k$, where $\Delta n$ is the real part of the refractive index change and $\alpha$, at a wavelength below the bandgap, is the free-carrier absorption coefficient. For input photon energies sufficiently below the band gap, $\alpha$ is very small. In the example discussed above, $\alpha c/2 k$ is estimated to be $2 \times 10^{-6}$ at 1.06 μm wavelength. It is a good approximation to assume that the carriers change only the real part of the refractive index.

The speed of the interferometer is limited by the carrier lifetime. A typical carrier lifetime of high quality semiconductor laser materials is on the order of five nanoseconds. The carrier lifetime can be shortened to much less than one nanosecond by introducing appropriate dopant or by ion implantation. The trade-off of shortening the carrier lifetime is the increase of injection current to maintain the same carrier density.

The interferometer can operate with the input and control signals at the same wavelength or at different wavelengths, depending upon the semiconductor materials that are chosen. For example, when the waveguide section is made of AlGaAs/GaAs quantum-well material with a band gap larger than 1.8 eV and the optoelectronic switches are made of semi-insulating GaAs with a band gap of 1.4 eV, the interferometer can operate with the control signals at any wavelength shorter than 8800 Å and the input signals at any wavelength longer than 6800 Å, by properly adjusting the bias voltages of the opto-electronic switches.

The foregoing embodiment and the concept therein can apply to InGaAsP/InP-based structures and other kinds of semiconductor materials.

Referring to FIG. 3, there is depicted an interferometer 30 with discrete laboratory optical components that have performed the current-induced phase-shift and interference measurements, thereby demonstrating the feasibility of this invention. The schematic depicted in FIG. 3 is similar to that of FIG. 1 with slight modifications. An input cw beam 31 at 1.06 μm wavelength is split into two beams 32, 33 by a beam-splitter 34. One beam 33 travels through free space without any modulation on its phase. The one beam 33, however, may be reflected by a suitable prism 34. The other beam 32 is coupled via a microscope objective 36 through an AlGaAs/GaAs waveguide 37 which is under direct current modulation. This beam 32 is then collimated with another microscope objective 38 and combined with the first beam 33 by a second beam-splitter 39 after being reflected via a suitable prism 41. The individual intensities of these two beams 32, 33 at the output 42 are well balanced. The two beams 32, 33 travel through equal distances. The relative traveling distance of the two beams 32, 33 is fine-tuned with a piezoelectric micropositioner (not shown) having a 100 Å resolution to determine the relative phase-shift of the two beams 32, 33. The experimental waveguide 37 was a single-mode semiconductor laser having a lasing threshold of 18 mA and active region dimensions of 2 μm by 1 μm by 300 μm, as depicted in FIG. 3.

With no current injection to the waveguide to modulate the phase of the beam, the relative phase shift to the two beams 32, 33 introduced by the micropositioning of the piezoelectric micropositioner (not shown) can be measured by the intensity of the combined output beam 43 versus the micropositioner voltage, for example, the application of $-65$ volts corresponds to a relative phase shift of $\pi$. When the waveguide is modulated with direct current, the relative phase of these beams 32, 33 shifts. In one experiment, to determine the phase shift, the voltage of the piezoelectric controller (the micropositioner) determines the positions for the maximum (constructive interference) and minimum (destructive interference) output intensities of the combined beam 43 when the waveguide 37 is injected with direct current at various levels. By experiment, it was determined that the waveguide 37 shifts the phase of the beam 32 by $\pi/3$ and $7\pi/13$ with direct current of 5 mA and 10 mA, respectively. It is clearly shown that the phase shift is nonlinear with injection current. The intensity of the combined beam versus the injection current at various starting phase differences between the two beams can be adjusted by a piezoelectric translator.

It has been calculated that the contribution to index changes by heating is negligible, about two orders of magnitude smaller than carrier-induced changes. Further, for phase shift of $\pi$ at 1.06 μm, $Nd = 9.8 \times 10^{16}/cm^2$, where N is the carrier density and d is the length of the waveguide. In relation to the current, $Nd = I\tau/wl$, where I is the injection current, w and l are the width and the thickness of the waveguide, respectively, and $\tau$ is the carrier lifetime which depends on the carrier density. The dependence of $\tau$ on N, $\tau^{-1} = A + BN + CN^2$, is the origin of the nonlinear phase-shift versus I in this experiment. It is estimated that $\tau = 21$ ns at I $= 5$ mA and $\tau$ is much longer at lower injection current levels. With these parameters, a practical interferometer as described can be designed based on the requirements of each individual application. For example, a waveguide of d=1 mm will introduce a phase shift of $\tau$ under a current of less than 15 mA.

Other modifications can be performed without departing from the spirit and scope of this invention. Thus, it is desired this invention be limited solely by the scope of the appended claims.

What is claimed is:

1. An optically controlled semiconductor waveguide interferometer apparatus comprising
   a Mach-Zehnder interferometer formed of semiconductor laser materials selected from the group consisting of double heterostructure and quantum-well semiconductor laser materials,
       said interferometer having a carrier input port and a carrier output port, and having two optical paths coupling said ports together for dividing an applied input optical signal to said input port and then recombining the divided input signal after passing through the two optical paths and providing the recombined signal onto said output port;
   first optoelectronic switching means adapted to be coupled across a first voltage potential and one of said optical paths, said first optoelectronic switching means having a gap therein; and
   means for applying a first light pulse to said gap for controlling the index of refraction of said one optical path,
   whereby
       said first light pulse controls said interferometer so that the output intensity of said interferometer is maximized.

2. The optically controlled interferometer apparatus as recited in claim 1 wherein said Mach-Zehnder interferometer is formed of double heterostructure semiconductor laser materials.

3. The optically controlled interferometer apparatus as recited in claim 1 wherein said Mach-Zehnder interferometer is formed of quantum-well semiconductor laser materials.

4. The optically controlled interferometer apparatus as recited in claim 1 wherein said optical paths are selected from the group consisting of semiconductor laser materials, free space, and optical fibers.

5. The optically controlled interferometer apparatus as recited in claim 1 wherein
   a first of said optical paths includes a pathway without said semiconductor laser materials.

6. The optically controlled interferometer apparatus as recited in claim 5 wherein
   said pathway includes free space.

7. The optically controlled interferometer apparatus as recited in claim 5 wherein
   said first of said optical paths coincides with said one of said optical paths.

8. An optically controlled semiconductor waveguide interferometer apparatus comprising
   a Mach-Zehnder interferometer formed of semiconductor laser materials selected from the group consisting of double heterostructure and quantum-well semiconductor laser materials;
       said interferometer having a carrier input port and a carrier output port, and having two optical paths coupling said ports together for dividing an applied input optical signal to said input port and then recombining the divided input signal after passing through the two optical paths and providing the recombined signal onto said output port;
   first optoelectronic switching means adapted to be coupled across a first voltage potential and one of said optical paths, said first optoelectronic switching means having a first gap therein;
   second optoelectronic switching means adapted to be coupled across a second voltage potential and the other of said optical paths, said second optoelectronic switching means having a respective gap therein;
   means for applying a first light pulse to said first gap for controlling the index of refraction of said one optical path;
   means for applying a second light pulse to said respective gap for controlling the index of refraction of said other optical path,
   whereby
       said light pulses control said interferometer so that the output intensity of said interferometer is maximized.

9. The optically controlled interferometer apparatus as recited in claim 8 wherein said Mach-Zehnder interferometer is formed of double heterostructure laser materials.

10. The optically controlled interferometer apparatus as recited in claim 8 wherein said Mach-Zehnder interferometer is formed of quantum-well semiconductor laser materials.

11. The optically controlled interferometer apparatus as recited in claim 8 wherein said optical paths are selected from the group consisting of semiconductor laser materials, free space, and optical fibers.

12. The optically controlled interferometer apparatus as recited in claim 8 wherein
   a first of said optical paths includes a pathway without said semiconductor laser materials.

13. The optically controlled interferometer apparatus as recited in claim 8 wherein
   said, pathway includes free space.

14. The optically controlled interferometer apparatus as recited in claim 8 wherein
   said first of said optical paths coincides with said one of said optical paths.

* * * * *